US009269145B2

(12) United States Patent
Ely et al.

(10) Patent No.: US 9,269,145 B2
(45) Date of Patent: Feb. 23, 2016

(54) SYSTEM AND METHOD FOR AUTOMATICALLY REGISTERING AN IMAGE TO A THREE-DIMENSIONAL POINT SET

(71) Applicant: Raytheon Company, Waltham, MA (US)

(72) Inventors: Richard W. Ely, Lewisville, TX (US); Jody D. Verret, Rockwall, TX (US); Grant B. Boroughs, Plano, TX (US)

(73) Assignee: Raytheon Company, Waltham, MA (US)

( * ) Notice: Subject to any disclaimer, the term of this patent is extended or adjusted under 35 U.S.C. 154(b) by 178 days.

(21) Appl. No.: 14/059,802

(22) Filed: Oct. 22, 2013

(65) Prior Publication Data

US 2014/0112536 A1 Apr. 24, 2014

Related U.S. Application Data

(60) Provisional application No. 61/717,414, filed on Oct. 23, 2012.

(51) Int. Cl.
| | |
|---|---|
| *G06T 15/00* | (2011.01) |
| *G06T 7/00* | (2006.01) |
| *G06T 15/50* | (2011.01) |
| *G06T 15/60* | (2006.01) |
| *G06T 17/05* | (2011.01) |

(52) U.S. Cl.
CPC ............. *G06T 7/0026* (2013.01); *G06T 15/506* (2013.01); *G06T 15/60* (2013.01); *G06T 17/05* (2013.01); *G06T 2207/10028* (2013.01); *G06T 2207/10032* (2013.01); *G06T 2207/30184* (2013.01); *G06T 2207/30212* (2013.01)

(58) Field of Classification Search
CPC .......... G06T 2207/10028; G06T 2207/10032; G06T 2207/30184; G06T 7/0026; G06T 15/506; G06T 15/60; G06T 17/05; G06T 2207/30212
USPC ........... 345/419, 428, 426, 631, 632; 382/103
See application file for complete search history.

(56) References Cited

U.S. PATENT DOCUMENTS 8,132,122 B2 * 3/2012 Risch et al. .................... 715/850
8,239,175 B2 * 8/2012 Wivell et al. .................... 703/2

OTHER PUBLICATIONS

Woff et al, Improved Diffuse Reflection Models for Computer Vision. International Journal of Computer Vision, 30(1), 55-71, 1998.*

(Continued)

*Primary Examiner* — Phu K Nguyen

(74) *Attorney, Agent, or Firm* — Schwegman Lundberg & Woessner, P.A.

(57) ABSTRACT

A system and methods can create a synthetic image of a target from a 3D data set, by using an electro-optical (EO) image and sun geometry associated with the EO image. In some examples, a 3D surface model is created from a 3D data set. The 3D surface model establishes a local surface orientation at each point in the 3D data set. A surface shaded relief (SSR) is produced from the local surface orientation, from an EO image, and from sun geometry associated with the EO image. Points in the SSR that are in shadows are shaded appropriately. The SSR is projected into the image plane of the EO image. Edge-based registration extracts tie points from the projected SSR. The 3D data set converts the tie points to ground control points. A geometric bundle adjustment aligns the EO image geometry to the 3D data set.

18 Claims, 4 Drawing Sheets

(56) References Cited

OTHER PUBLICATIONS

Glennie et al, Geodetic Imaging with Airborne LiDAR: the Earth's Surface Revealed, Reports on Progress in Physics, Jul. 2013, pp. 1-24.*

Randall Smith, Analyzing Terrain and Surfaces with TNTmips, Microimages, Inc., Aug. 23, 2013, pp. 1-22.*

Tilesets—Google earth: View Shaded Relief Using a Custom terrain, Microimages, May 2013, pp. 1.*

Airborne1—LiDAR and Oblique Home Page, [online}. [archived on Feb. 22, 2012]. Retrieved from the Internet: <URL: https://web.archive.org/web/20120222220314/http://www.airborne1.com/>, (2012), 1 pg.

"GeoEye® Elevating Insight, Internent Home p.", [online]. © 2012 GeoEye, Inc. [archived on Feb. 9, 2012]. Retrieved from the Internet: <URL: https://web.archive.org/ web/20120209083833/http://www.geoeye.com/CorpSite/>, (2012), 2 pgs.

Knowlton, Robert, "Airborne Ladar Imaging Research Testbed", Tech Notes, Lincoln Laboratory, Massachusetts Institute of Technology, (2011), 2 pgs.

* cited by examiner

SYSTEM AND METHOD FOR AUTOMATICALLY REGISTERING AN IMAGE TO A THREE-DIMENSIONAL POINT SET

CROSS-REFERENCE TO RELATED APPLICATION

This application claims the benefit of priority to U.S. Provisional Application No. 61/717,414, filed Oct. 23, 2012, titled "System And Method For Automatic Ladar-EO Image Registration", which is hereby incorporated by reference herein in its entirety.

GOVERNMENT LICENSE RIGHTS

This invention was made with Government support under Contract 08-C-3104. The Government has certain rights in this invention.

TECHNICAL FIELD

Examples pertain to automatic registration of three-dimensional data. Some examples relate to automatic target recognition.

BACKGROUND

Commercial earth observation satellites, such as Ikonos and Geoeye-1, offer imagery of ground-based targets. These satellites typically offer multispectral (MSI) imaging, which provides images at red, green, blue, and near-infrared wavelengths, and panchromatic (PAN) imaging, which provides black-and-white images formed from wavelengths that span the visible spectrum. This imagery is commonly referred to as electro-optical (EO) imagery.

In many cases, the multispectral images show registration errors with respect to one another and with respect to 3D sources such as LADAR, a digital elevation model database, a system that generates 3D points from imagery, radar generated points, or another suitable sources. For instance, white vent covers on a non-white roof may not be aligned with their proper three-dimensional locations, or a LADAR point set from a sidewalk may be erroneously colored with the grass adjacent to it. These are but two specific examples; other registration errors are possible. These registration errors may complicate use of the multispectral images, and can introduce uncertainty in downstream applications that rely on the multispectral images to locate particular objects.

Laser Detection and Ranging (LADAR), typically obtained from aircraft that fly over the ground-based targets, can produce a three-dimensional profile of the targets. LADAR can produce a collection of points that represent the surface or surfaces of the targets, which is often referred to as a point cloud. Some 3D data sets obtained from LADAR can include additional intensity information corresponding to the location data. 3D data sets that include the intensity information can be used to form an image from which traditional 2D image-to-image registration techniques can be applied. However, some 3D data sets may lack the associated intensity information, and therefore cannot be used with the traditional image-to-image registration techniques.

SUMMARY

A system and methods can produce a synthetic image of a target from a 3D data set, by using the imaging geometry and sun geometry associated with the electro-optical (EO) image. The synthetic image is generated via surface shaded relief (SSR). The SSR is projected to the EO image space and registered using 2D techniques, but the underlying 3D ground positions are retained so that the registration results in accurate ground control points that precisely tie the image to the 3D point data.

In some examples, a 3D surface model is created from a 3D data set. The 3D surface model establishes a local surface orientation at each point in the 3D data set. A surface shaded relief (SSR) is produced from the local surface orientation of the 3D point set and from the sun geometry associated with the EO image. Points in the SSR that are in shadows are shaded appropriately. The SSR is projected into the image plane of the EO image. Edge-based registration extracts tie points between the EO image and the projected SSR. The 3D data set converts the tie points to ground control points. A geometric bundle adjustment aligns the EO image geometry to the 3D data set.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
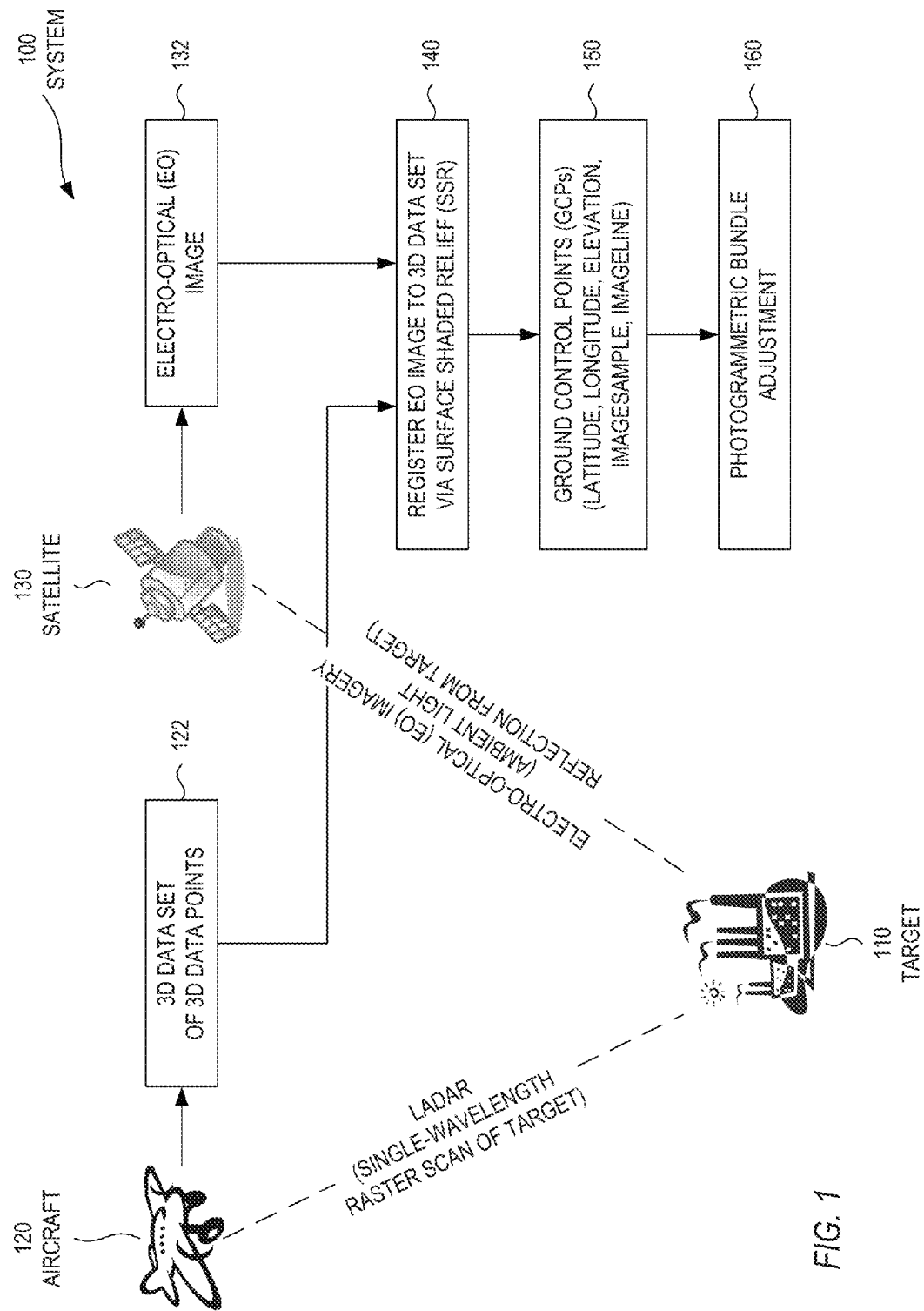
FIG. 1 is a schematic drawing of an example of a system that automatically registers a 3D data set with a two-dimensional image in accordance with some embodiments.

FIG. 1 is a schematic drawing of an example of a system 100 that automatically registers a 3D data set with a two-dimensional image in accordance with some embodiments.

The system 100 provides images of a target 110. Suitable targets 110 can include a building, a campus of buildings, a military facility, and others, or even just ground terrain. The target 110 is often in an inhospitable environment, and is usually inaccessible from the ground. As a result, the target 110 may be observable only from above, as viewed from an aircraft or a satellite. The target 110 is not part of the system 100.

An aircraft 120 can fly over the target 110, and can use Laser Detection And Ranging (LADAR) to observe the target 110. In LADAR, the aircraft 120 sends a laser pulse downward, toward the target 110, receives light reflected from the target 110, and formulates a distance to the target based on a time-of-flight of the laser pulse. LADAR scans the laser pulses from side-to-side while flying over the target 110, thereby obtaining data from the target 110 in two lateral dimensions. LADAR returns values of height (Z) of the target 110 as a function of lateral location (X,Y) on the target 110. The collection of (X,Y,Z) points returned from a LADAR scan is referred to as a 3D data set 122, or, equivalently, a plurality of 3D data points, a point cloud, or a collection of geodetic coordinates. The 3D data produced by LADAR is considered to be highly accurate. In addition, some LADAR sensors can return values of reflected intensity as a function of lateral location (X,Y), for the wavelength at which the target 110 is scanned. Typically, LADAR uses an eye-safe wavelength in the infrared. LADAR does not return color information from the target 110, and cannot produce a color image of the target 110. The system 100 does not require or use the intensity values from the 3D point set. The aircraft 120 and LADAR system are not part of the system 100; the 3D data 122 is an input to the system 100.

A satellite 130 can also fly over the target 110, and can use electro-optical (EO) imagery to observe the target 110. EO imagery relies on ambient light reflected from the target 110, and does not use explicit illumination. The ambient light reflected from the target 110 is collected by a camera on the satellite 130, which produces an electro-optical (EO) image 132. The EO image 132 can also be provided from airborne EO sensors. Most of the satellite imaging systems and some airborne platforms provide geometric ground-to-image and image-to-ground projections in the form of rational polynomial coefficients (RPC), although other projection quantities can also be used. The satellite 130 is not part of the system 100; the EO image 132 is an input to the system 100.

At 140, the system 100 receives the 3D data set 122 and the EO image 132 as inputs, and registers the EO image 132 to the 3D data set 122 using surface shaded relief (SSR). Surface shaded relief can include the profiling of bare terrain, in addition to man-made structures. At 150, the system 100 receives the SSR and produces a set of ground control points (GCPs). Each GCP can include the five quantities of latitude, longitude, elevation, imageSample, and imageLine. Other quantities can also be used. At 160, the system 100 receives the GCPs and performs a photogrammetric bundle adjustment to align the EO image with the 3D data set. FIG. 1 shows one example for a system 100 that can retrieve, store, generate, manipulate, and process images and data sets; other suitable systems may also be used.

The system 100 can be a computer system that includes hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

An example of a system that performs an SSR-based auto GCP algorithm can include three basic steps. First, assuming that all surfaces in the target are Lambertian, the system assigns each point in the 3D data set an intensity that is proportional to the dot product of a sun vector angle and a surface local unit normal vector at the respective point. Points in full shadow are identified and given a shadow intensity derived from an atmospheric scattering model. The shadow intensities are not identically zero, so that some detail within the shadows can be observed under ambient or reflective lighting conditions. Second, the system performs an edge-based correlation process at a grid of points between the projected SSR and EO images. The system retains points with good correlation metrics and converts the retained points to ground control points. Third, the system performs a photogrammetric bundle adjustment to align the image with the 3D data set. Other suitable steps can also be used.

Figure 2:
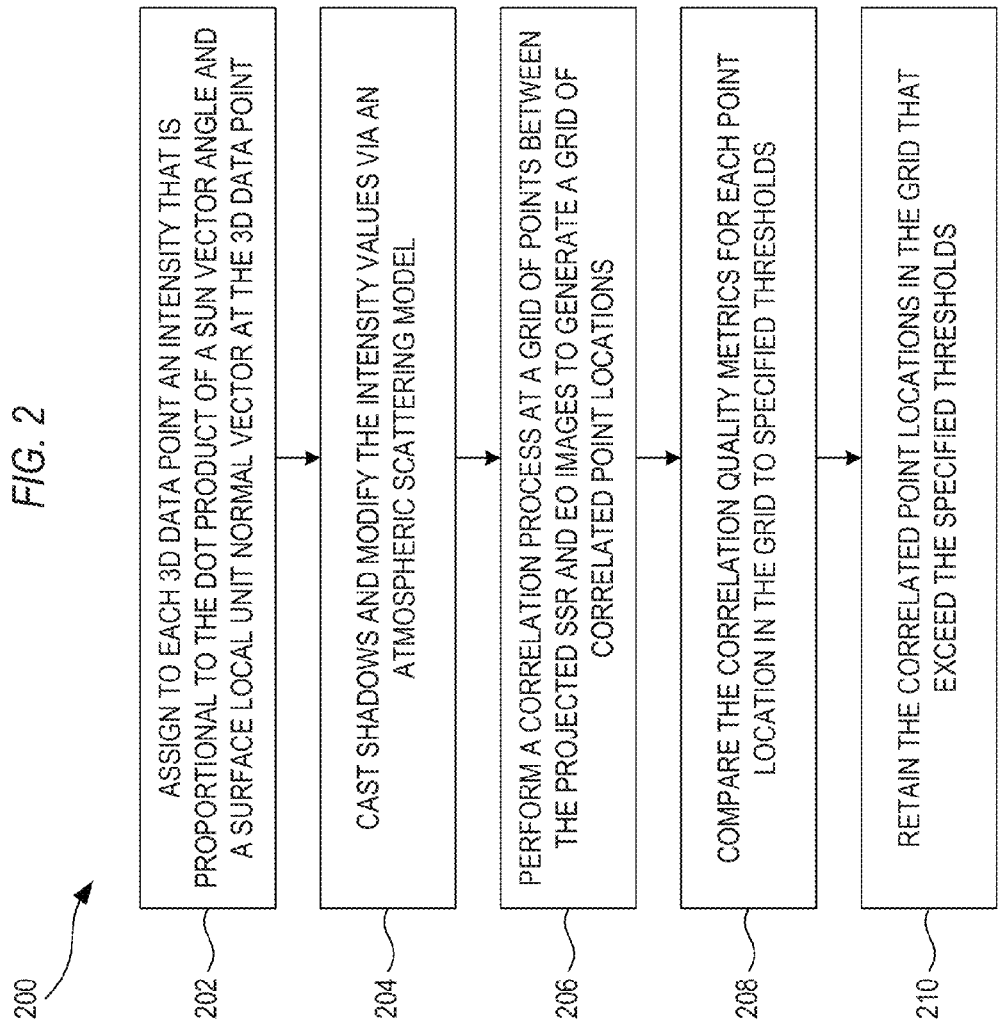
FIG. 2 is a flow chart of an example of a basic method of automatically extracting the ground control points from a set of 3D data, using SSR rather than intensity data provided by LADAR in accordance with some embodiments.

FIG. 2 is a flow chart of an example of a basic method 200 of automatically extracting the ground control points (150 in FIG. 1) from a set of 3D data and image data (122 and 132 in FIG. 1), using SSR rather than intensity data provided by LADAR, in accordance with some embodiments.

Step 202 assigns to each 3D data point (122 in FIG. 1) an intensity that is proportional to the dot product of a sun vector angle and a surface local unit normal vector at the respective 3D data point. Locations that experience sun occlusions, e.g., in shadows, are included with this process as well. In some examples, assigning the intensity can include computing the sun's local azimuth and elevation angles from an acquisition date and time of an electro-optical image. In other examples, assigning the intensity can include extracting the sun vector angle from metadata of an electro-optical image.

Step 204 casts shadows and modifies the intensity values via an atmospheric scattering model. The intensity of shadows is not identically equal to zero, so that ambient or reflective lighting conditions can reveal detail within the shadows and can distinguish shadow locations from voids during the registration process. In some examples, modifying the intensity values can include producing a surface shaded relief value for each three-dimensional data point, using the three-dimensional data points as elevation data and casting shadows.

Step 206 performs a correlation process at a grid of points between the projected SSR and EO images to generate a grid of correlated point locations. In some examples, performing the correlation process can include rasterizing the surface shaded relief values, projecting the rasterized surface shaded relief values to the space of the electro-optical image using associated XYZ locations provided by the three-dimensional data set to form a projected surface shaded relief image, and performing image correlations between the projected surface shaded relief image and the electro-optical image. In some examples, performing the correlation process can further include obtaining X,Y,Z Universal Transverse Mercator (UTM) coordinates for respective projected surface shaded relief image coordinates, converting the X,Y,Z UTM coordinates to geodetic coordinates, and producing ground control points (GCP) and corresponding electro-optical image coordinates from the geodetic coordinates. Geodetic coordinates can include latitude, longitude, and height. Ground control points can include values of latitude, longitude, elevation, and corresponding EO imageSample and imageLine coordinates. The system, such as system 100, can use the latitude, longitude, and height and corresponding image coordinates downstream as ground control points in a photogrammetric bundle adjustment of the electro-optical image.

Step 208 compares the correlation quality metrics for each location point in the grid to specified thresholds to identify registration errors. The metrics can include both absolute and relative metrics.

Step 210 retains the correlated point locations in the grid that exceed the specified thresholds. The retained point locations can represent a set of good correlation points. In some examples, the quality metric thresholds can be iteratively relaxed to achieve an adequate number of control points. FIG. 2 shows one example for automatically extracting the ground control points from a set of 3D data; other suitable methods may also be used.

Figure 3:
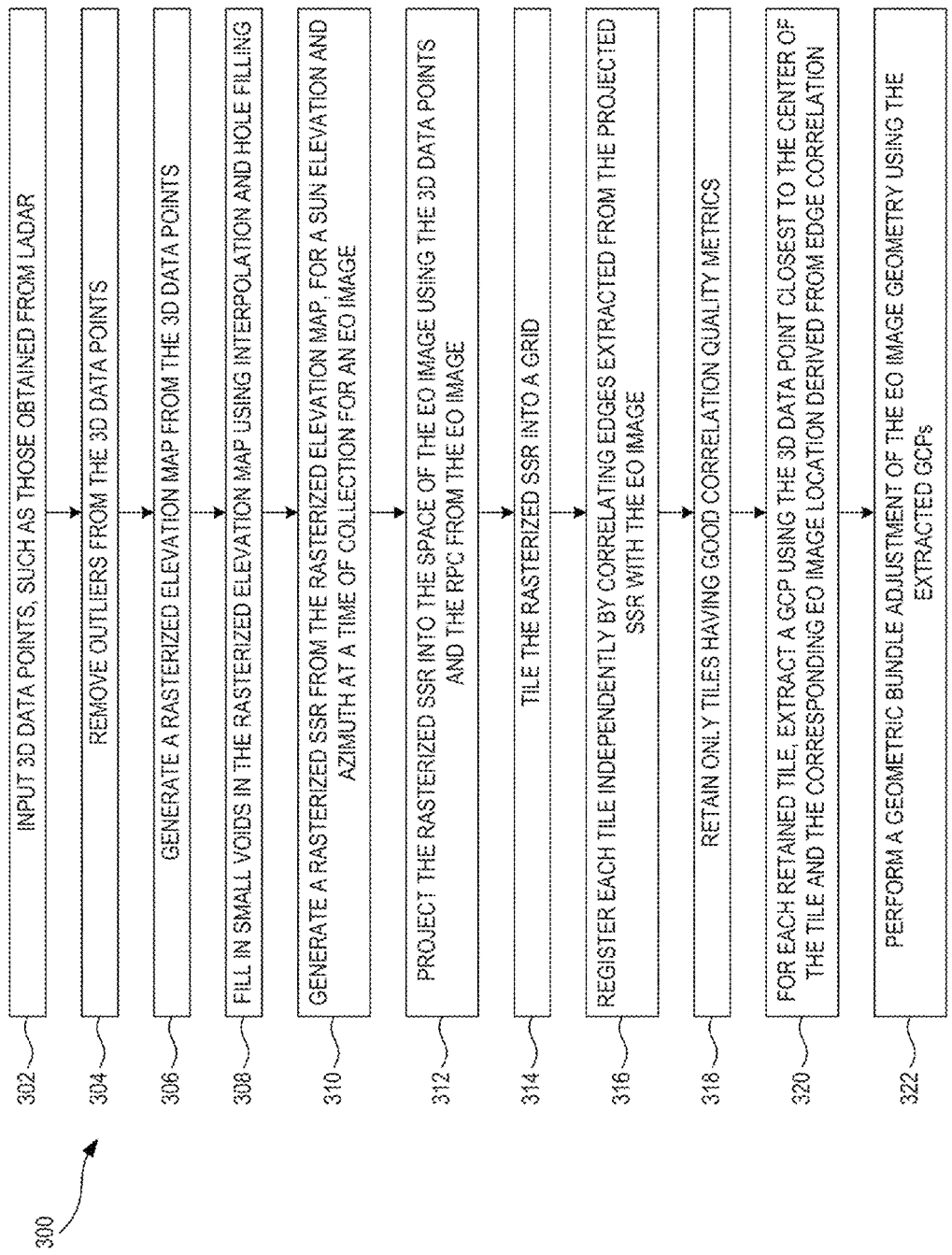
FIG. 3 is a flow chart of an example of a basic method of FIG. 2 in a more detailed method of automatically extracting the ground control points from a set of 3D data, using SSR rather than intensity data provided by LADAR in accordance with some embodiments.

FIG. 3 fleshes out the basic method 200 of FIG. 2 in a more detailed method 300 of automatically extracting the ground control points (124 in FIG. 1) from a set of 3D data (122 in FIG. 1), using SSR rather than intensity data provided by LADAR, in accordance with some embodiments. Step 302 inputs a set of 3D data. The 3D data set includes a plurality of 3D data points. The 3D data points, also referred to as XYZ points, can be obtained from LADAR, or from any suitable source. Step 304 removes outliers from the 3D data points, which could cause artifacts downstream in the SSR. Outliers in the 3D data set can be caused by vertically-oriented objects, such as towers and telephone poles, and wires, as well as spurious points from the LADAR collect. Step 306 generates a rasterized elevation map from the 3D data points. Step 308 fills in small voids in the rasterized elevation map, using interpolation, hole filling, and other suitable techniques. Step 310 generates a rasterized surface shaded relief (SSR) from the rasterized elevation map, for a sun elevation and azimuth at a time of collection for an EO image. In some examples, the time of collection corresponds to an actual time of collection of an actual EO image. In other examples, the time of collection corresponds to a selected time that need not be an actual collection time. For instance, the selected time can correspond to a time at which the scene is to be observed, so that objects in the scene can be recognized with proper shading appropriate to the time of observation. Step 312 projects the rasterized SSR into the space of the EO image, using the 3D data points and rational polynomial coefficients (RPCs) from the EO image. The resulting projected SSR looks very similar to the original EO image, with regard to shadow edge content. Step 314 tiles the rasterized SSR into a grid. Step 316 registers each tile independently by correlating edges extracted from the projected SSR with the EO image. Since the edges in the SSR usually have counterparts in the EO image (but not necessarily vice versa), a preferred technique is to extract edge pixels from the SSR and register them to the EO using edge correlation. This process is more robust and accurate than standard image-to-image correlation techniques, such as normalized cross correlation. Step 318 retains only tiles having good quality metrics. In some examples, the quality metric can include a threshold on a particular characteristic, such as a correlation score. If a particular tile has a corresponding value of the characteristic that exceeds the threshold, the tile can be considered good, and can be retained by step 318. Step 320, for each retained tile, extracts a ground control point (GCP), using the 3D data point closest to the center of the tile and the corresponding EO image location derived from the edge correlation of step 316. Step 322 performs a geometric bundle adjustment of an EO image geometry, using the extracted GCPs of step 320. FIG. 3 shows one example for automatically extracting the ground control points from a set of 3D data; other suitable methods may also be used.

Figure 4:
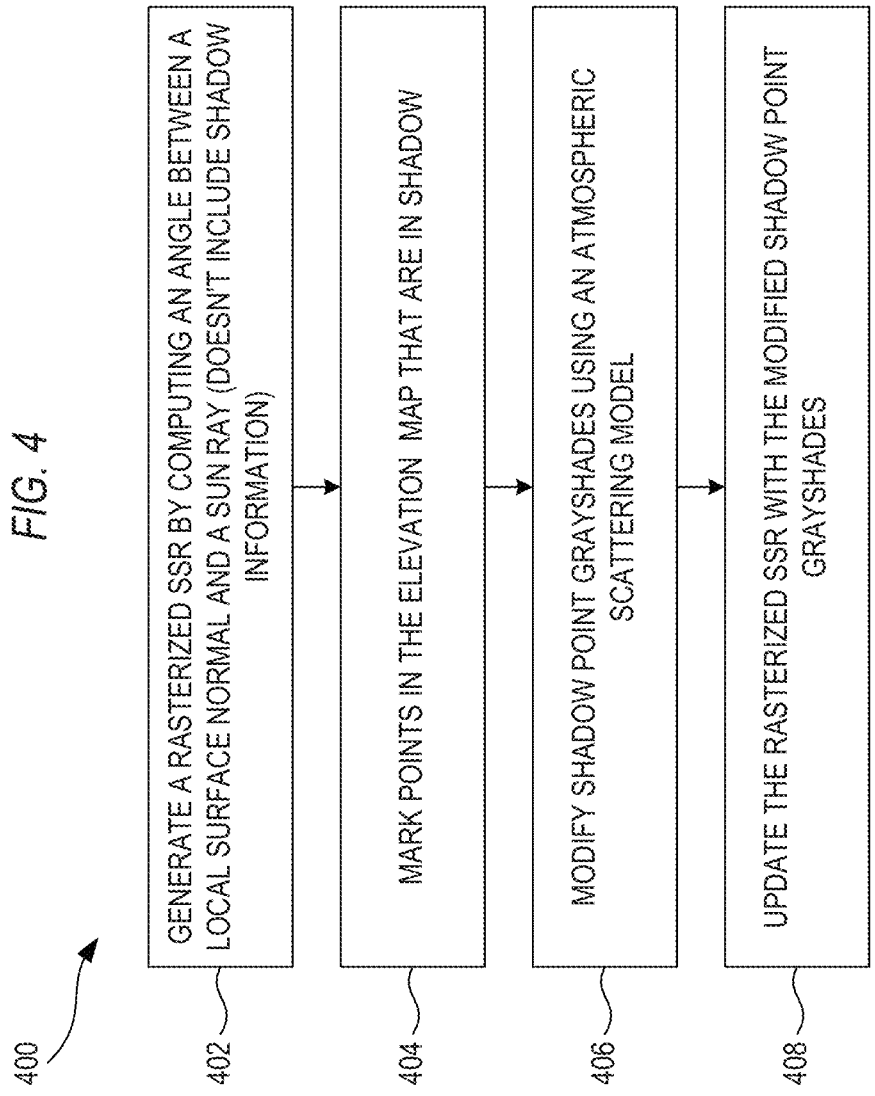
FIG. 4 is a flow chart of an example of generating a rasterized surface shaded relief (SSR) from the rasterized elevation map, for a sun elevation and azimuth at a time of collection for an EO image, in accordance with some embodiments.

FIG. 4 fleshes out the step 310 of generating a rasterized surface shaded relief (SSR) from the rasterized elevation map, for a sun elevation and azimuth at a time of collection for an EO image, in accordance with some embodiments. Step 402 generates a rasterized surface shaded relief (SSR) by computing an angle between a local surface normal and a sun ray. At this stage, the SSR does not include shadow information. Step 404 marks points in the elevation map that are in shadow. Step 406 modifies shadow point grayshades, using an atmospheric scattering model. Step 408 updates the rasterized SSR with the modified shadow point grayshades.

One particularly interesting outcome of generating the SSR for auto-GCPs is that the SSR intensity output at every 3D data point can be a useful product in and of itself. Even in the absence of complementary EO imagery, SSR can provide an additional useful visual context of the underlying terrain and associated ground features, further complementing the usual color-mapped height presented in standard LADAR viewers.

The system 100 (of FIG. 1) can include robust outlier rejection. The bundle adjustment is a simultaneous geometric solution utilizing all of the GCPs. If any of the GCP image residuals exceed a statistical tolerance, the observation can be removed from the adjustment. This can reduce the number of false positive auto-GCP correlations, which could otherwise produce erroneous conjugates.

The system 100 (of FIG. 1) can include occlusion processing for LADAR colorization. In some cases, the system can evaluated each point cloud location and project through the BA-RPCs to obtain image coordinates. As a byproduct of this ground-to-image approach, points on the ground (e.g., under trees) not visible to a satellite camera can be colorized with the associated observed pixel intensities (e.g. trees). A better approach for dealing with occlusions is to project from the original satellite image coordinates down to the point cloud. In this way, the image-to-ground line-of-sight (LOS) vector can be used in conjunction with the point cloud data for occlusion processing. If the LOS vector intersects a point on a building before a point on the ground, the ground point is not colorized.

The system 100 (of FIG. 1) can include occlusion processing for point cloud data filtering based on vector element thresholding. If the occlusion processing works appropriately, elements of the multi-image LADAR vector can be thresholded for filtering of the 3D point cloud data. For example, NDVI intensities can be used as a thresholding mechanism for removal of foliage for more robust foliage penetration (FOPEN) processing of the LADAR data. The removal of foliage points can be achieved via an interactive tool in which the points below specific NDVI values are removed. Alternatively, the same process can be achieved via an automatic algorithm.

The system 100 (of FIG. 1) can include use of LADAR data in target orientation estimation. Since the underlying LADAR data is 3D, the local orientation of strategic targets can easily be estimated. The orientation of a target surface can be important for spectroradiometric exploitation algorithms that rely on accurate measurements of the Bidirectional Reflectance Distribution Function (BRDF). One such algorithm is material identification of a target in a scene via multispectral EO image radiometry. With EO imagery alone, target orientation is often assumed to be horizontal, or else estimated by a human. With fused LADAR and EO, the target orientation can be accurately estimated automatically, via the 3D XYZ coordinates of the LADAR data. Then, the corresponding target reflectance can be computed from the radiometric EO data and the estimated target tilt.

What is claimed is:

1. A system for producing a synthetic image from three-dimensional data set that includes a plurality of three-dimensional data points, the system comprising processing circuitry arranged to:

assign to each three-dimensional data point an intensity that is proportional to a dot product of a sun vector angle and a surface local unit normal vector at the three-dimensional data point;
cast shadows and modify the assigned intensity values via an atmospheric scattering model;
perform a correlation process at a grid of points between projected surface shaded relief and electro-optical images to generate a grid of correlated point locations;
compare correlation quality metrics for each correlated point location in the grid to specified thresholds; and
retain the correlated point locations in the grid that exceed the specified thresholds.

2. The system of claim 1, wherein assigning to each three-dimensional data point the intensity that is proportional to the dot product of the sun vector angle and the surface local unit normal vector at the three-dimensional data point comprises:
computing the sun's local azimuth and elevation angles from an acquisition date and time of an electro-optical image.

3. The system of claim 1, wherein assigning to each three-dimensional data point the intensity that is proportional to the dot product of the sun vector angle and the surface local unit normal vector at the three-dimensional data point comprises:
extracting the sun vector angle from metadata of an electro-optical image.

4. The system of claim 1, wherein modifying the assigned intensity values via the atmospheric scattering model comprises:
producing a surface shaded relief value for each three-dimensional data point, using the three-dimensional data points as elevation data and casting shadows.

5. The system of claim 1, wherein performing the correlation process at the grid of points between projected surface shaded relief and electro-optical images comprises:
rasterizing the surface shaded relief values;
projecting the rasterized surface shaded relief values to the space of the electro-optical image using associated XYZ locations provided by the three-dimensional data set to form a projected surface shaded relief image; and
performing image correlations between the projected surface shaded relief image and the electro-optical image.

6. The system of claim 5, wherein performing the correlation process at the grid of points between projected surface shaded relief and electro-optical images further comprises:
obtaining X,Y,Z Universal Transverse Mercator (UTM) coordinates for respective projected surface shaded relief image coordinates;
converting the X,Y,Z UTM coordinates to geodetic coordinates; and
producing ground control points (GCP) and corresponding electro-optical image coordinates from the geodetic coordinates.

7. The system of claim 6, wherein the geodetic coordinates include latitude, longitude, and height.

8. The system of claim 6, wherein each ground control point includes values of latitude, longitude, elevation, and corresponding EO imageSample and imageLine coordinates.

9. The system of claim 8, wherein the processing circuitry is further arranged to:
use the latitude, longitude, and height and corresponding image coordinates as ground control points in a photogrammetric bundle adjustment of the electro-optical image.

10. A system for producing a synthetic image from three-dimensional data set that includes a plurality of three-dimensional data points, the system comprising processing circuitry arranged to:
input a three-dimensional data set that includes a plurality of three-dimensional data points;
generate a rasterized elevation map from the three-dimensional data points;
generate a rasterized surface shaded relief from the rasterized elevation map, for a sun elevation and azimuth at a time of collection for an electro-optical image;
project the rasterized surface shaded relief into a space of the electro-optical image;
tile the rasterized surface shaded relief into a grid;
register each tile independently;
retain tiles having correlating quality metrics that exceed respective specified thresholds;
for each retained tile, extract a ground control point; and
perform a geometric bundle adjustment of a geometry of the electro-optical image using the extracted ground control points.

11. The system of claim 10, further comprising, between inputting the three-dimensional data set that includes the plurality of three-dimensional data points and generating the rasterized elevation map from the three-dimensional data points:
removing outliers from the three-dimensional data points.

12. The system of claim 10, further comprising, between generating the rasterized elevation map from the three-dimensional data points and generating the rasterized surface shaded relief from the rasterized elevation map:
filling in voids in the rasterized elevation map using interpolation and hole filling.

13. The system of claim 10, wherein the rasterized surface shaded relief is projected into the space of the electro-optical image using the three-dimensional data points and rational polynomial coefficients from the electro-optical image.

14. The system of claim 10, wherein each tile is registered independently by correlating edges extracted from the projected surface shaded relief with the electro-optical image.

15. The system of claim 10, wherein, for each retained tile, the ground control point is extracted using a three-dimensional data point closest to a center of the tile and a corresponding electro-optical image location derived from the edge correlation.

16. The system of claim 10, wherein generating a rasterized surface shaded relief from the rasterized elevation map comprises:
generating a rasterized surface shaded relief by computing an angle between a local surface normal and a sun ray;
marking three-dimensional data points in the rasterized elevation map that are in shadow;
modifying shadow point grayshades using an atmospheric scattering model; and
updating the rasterized surface shaded relief with the modified shadow point grayshades.

17. A system for producing a synthetic image from three-dimensional data set that includes a plurality of three-dimensional data points, the system comprising processing circuitry arranged to:
input a three-dimensional data set that includes a plurality of three-dimensional data points;
remove outliers from the three-dimensional data points;
generate a rasterized elevation map from the three-dimensional data points;
fill in voids in the rasterized elevation map using interpolation and hole filling;

generate a rasterized surface shaded relief from the rasterized elevation map, for a sun elevation and azimuth at a time of collection for an electro-optical image;
project the rasterized surface shaded relief into a space of the electro-optical image using the three-dimensional data points and rational polynomial coefficients from the electro-optical image;
tile the rasterized surface shaded relief into a grid;
register each tile independently by correlating edges extracted from the projected surface shaded relief with the electro-optical image;
retain tiles having correlating quality metrics that exceed respective specified thresholds;
for each retained tile, extract a ground control point using a three-dimensional data point closest to a center of the tile and a corresponding electro-optical image location derived from the edge correlation; and
perform a geometric bundle adjustment of a geometry of the electro-optical image using the extracted ground control points.

18. The system of claim 17, wherein generating the rasterized surface shaded relief from the rasterized elevation map comprises:
generating a rasterized surface shaded relief by computing an angle between a local surface normal and a sun ray;
marking three-dimensional data points in the rasterized elevation map that are in shadow;
modifying shadow point grayshades using an atmospheric scattering model; and
updating the rasterized surface shaded relief with the modified shadow point grayshades.

* * * * *